J. W. RYKARD.
Grain-Planter.
No. 221,104.                Patented Oct. 28, 1879.
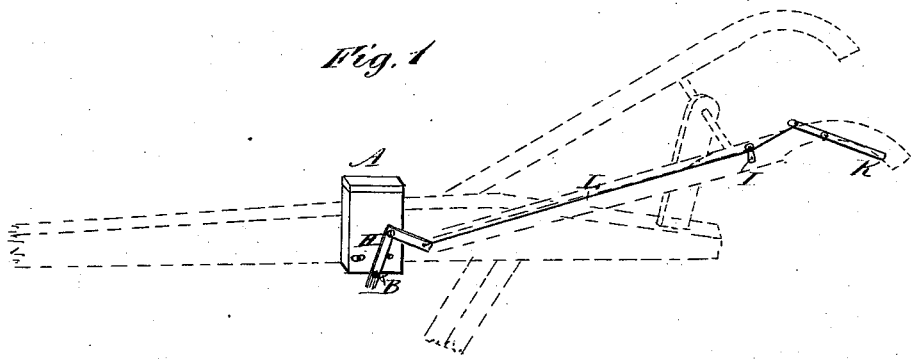
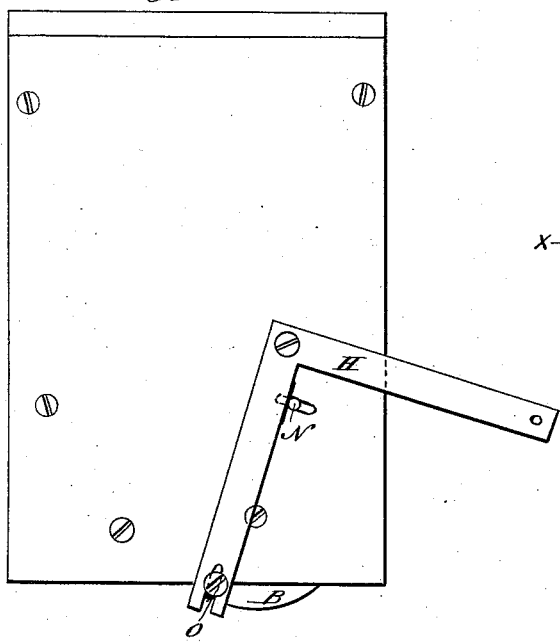
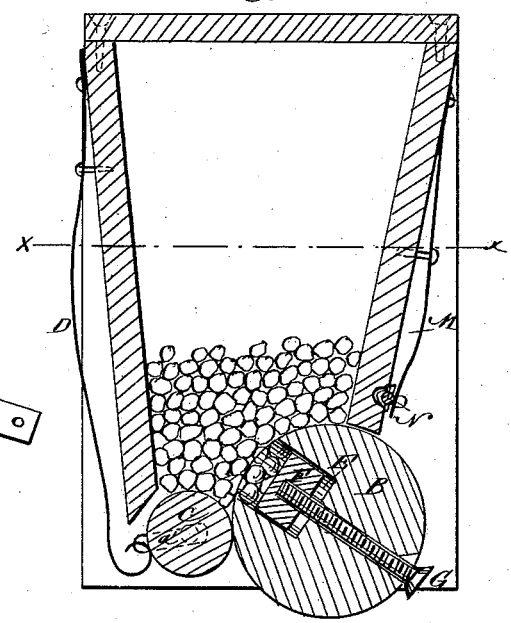
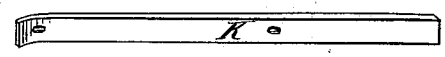
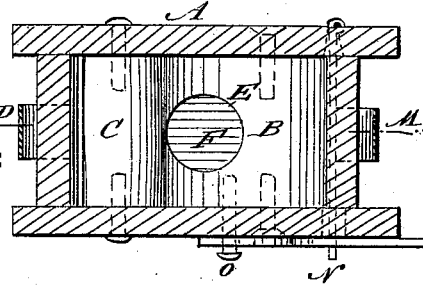
WITNESSES:
C. Neveux
C. Sedgwick
INVENTOR:
J. W. Rykard
BY
Munn & Co
ATTORNEYS.

UNITED STATES PATENT OFFICE.

JOHN W. RYKARD, OF ABBEVILLE, SOUTH CAROLINA.

IMPROVEMENT IN GRAIN-PLANTERS.

Specification forming part of Letters Patent No. 221,104, dated October 28, 1879; application filed May 27, 1879.

*To all whom it may concern:*

Be it known that I, JOHN W. RYKARD, of Abbeville, in the county of Abbeville and State of South Carolina, have invented a new and Improved Grain-Planter, of which the following is a specification.

Figure 1 represents the device attached to a plow. Fig. 2 is a side elevation of the planter. Fig. 3 is a vertical sectional elevation. Fig. 4 is a cross-section on line x x, Fig. 3. Fig. 5 is a side view of the lever that is attached to the plow-handle. Fig. 6 is an elevation of the roller or traveler that is attached to the plow-handle.

Similar letters of reference indicate corresponding parts.

The object of this invention is to furnish a simple, inexpensive, and effective seed planter or dropper for attachment to a plow, to be operated by the plowman.

The invention consists of the hopper A, having two perpendicular and two sloping sides, a cover that may be removed for the admission of the grain or seeds to be planted, and a large roller, B, and a smaller one, C, that close the bottom of the hopper. Both rollers have axles that pass through the perpendicular sides of the hopper, the axle of the smaller roller being set in a slot, a', so as to be laterally adjustable, and somewhat lower than that of the larger roller, and the smaller is pressed by the spring D against the larger one, and because of its lateral adjustability it prevents any obstruction of the movement of the larger roller from lodgment of seeds or grain between the two.

The larger roller is furnished with a charger or socket, E, for the reception of seed, at the bottom of which is a movable disk, F, which is acted upon by the screw G, that passes through from the opposite side of the roller. By this disk and screw the measuring capacity of the charger is adjusted to carry a greater or less quantity of seeds or grain. In one end of this roller, and near its periphery, is a pin or screw, O, that serves as a stop, by contact with the lower edge of the hopper, to limit the movement of the roller, and also as a point of attachment for the rectangular lever H, that is pivoted upon a side of the hopper and embraces the pin O with its slotted end.

When the planter is secured upon a side of the plow-beam, as shown in Fig. 1, the traveler I is also attached to a point on the inside of the plow-handle, and above it, on the inside of the same handle, is pivoted the lever K, while the cord or wire L, that passes under the traveler, connects the two levers H and K. The operator, wishing to drop seed or grain, presses down on the long arm of the lever K, which is convenient to his hand, and thus causes the roller B to turn so as to bring the charger below the contact-point of the two rollers and discharge its contents upon the ground. The roller B is then turned back to its primary position by the action of the spring M and rod N upon the lever H, so that the charger may be refilled from the contents of the hopper. The ends of this rod N rest in slots in the perpendicular sides of the hopper, and it is held by the spring M against the lower arm of the lever H.

Thus it will be seen that at each release of and pressure upon the lever K the charger is alternately filled and its contents discharged.

Having thus described my invention, I claim as new and desire to secure by Letters Patent—

The within-described grain-planter, consisting of hopper A, rollers B and C, springs D and M, socket or charger E, disk F, screw G, screw or pin O, lever H, and rod N, in combination with the lever K, traveler I, and cord L, constructed substantially as herein shown and described.

JOHN WESLEY RYKARD.

Witnesses:
J. W. PERRIN,
J. F. C. DU PRÉ.